Oct. 28, 1941.    K. W. MESTERTON    2,261,095
VEGETABLE DICER
Filed June 12, 1940    4 Sheets-Sheet 2
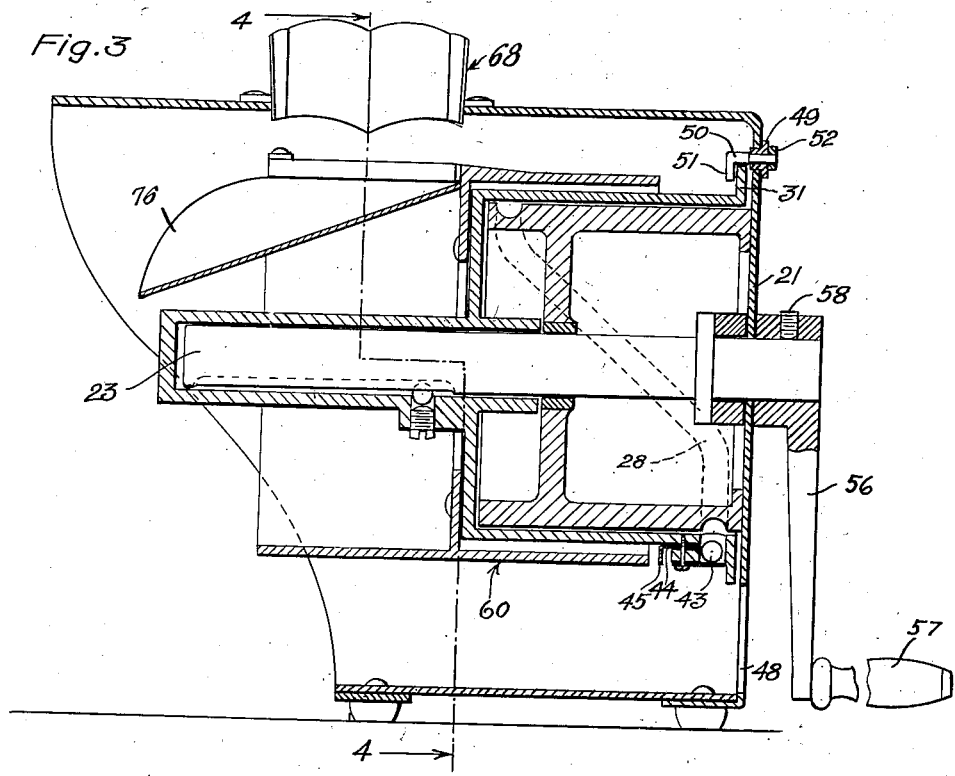
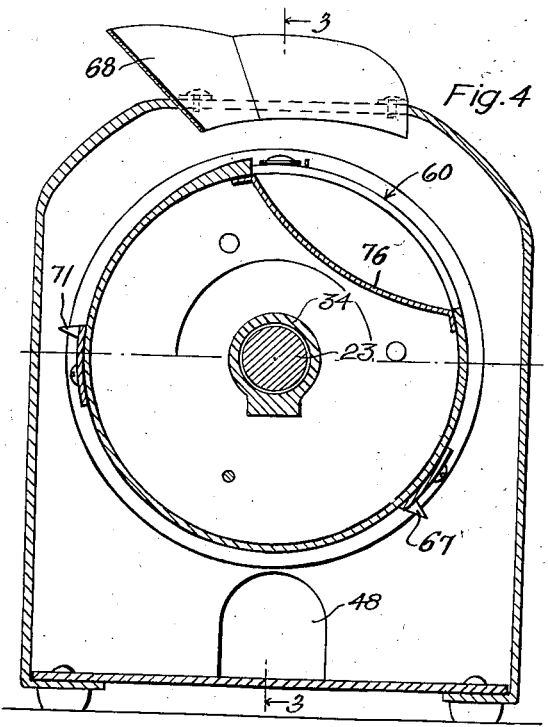
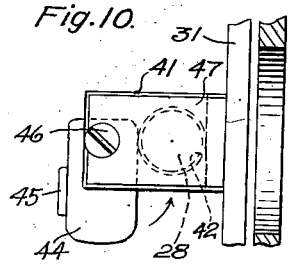
INVENTOR
*Kuno W. Mesterton*
BY
*Van Deventer + Grier*
ATTORNEYS Oct. 28, 1941.  K. W. MESTERTON  2,261,095
VEGETABLE DICER
Filed June 12, 1940  4 Sheets-Sheet 3

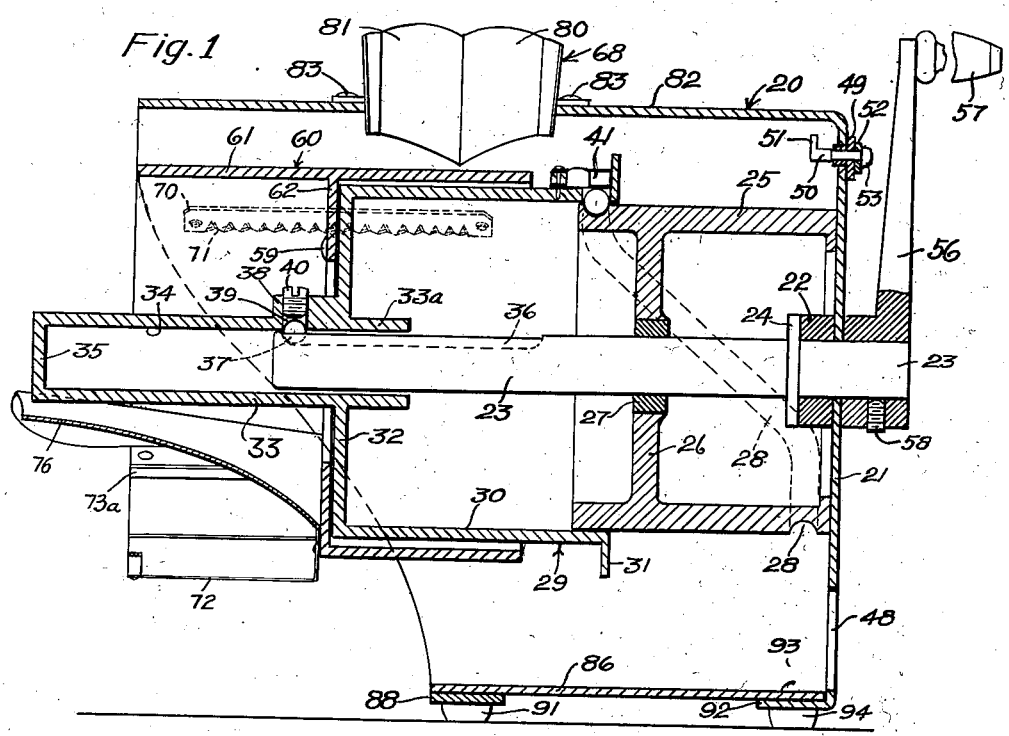

INVENTOR
Kuno W. Mesterton
BY
Van Deventer + Grier
ATTORNEYS

Oct. 28, 1941.   K. W. MESTERTON   2,261,095
VEGETABLE DICER
Filed June 12, 1940   4 Sheets-Sheet 4
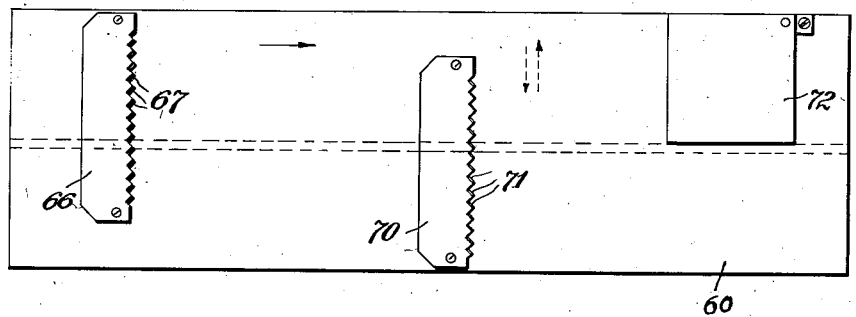
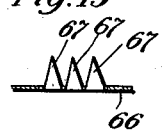
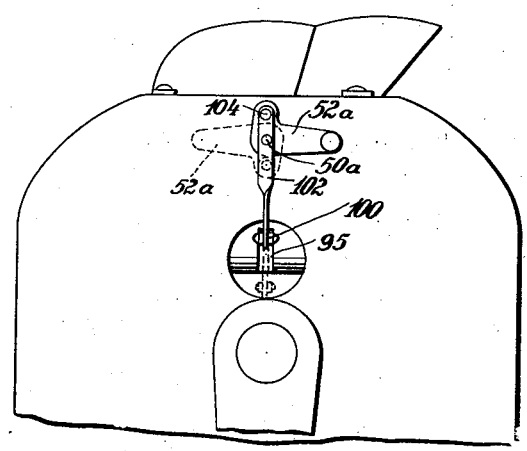
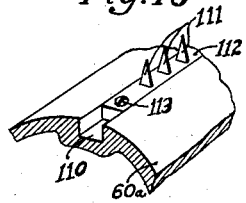
INVENTOR:
Kuno W. Mesterton
BY
ATTORNEYS.

Patented Oct. 28, 1941

2,261,095

UNITED STATES PATENT OFFICE 2,261,095

VEGETABLE DICER

Kuno W. Mesterton, Brooklyn, N. Y.

Application June 12, 1940, Serial No. 340,043

15 Claims. (Cl. 146—78)

This invention relates to improvements in vegetable dicers and has for an object the provision of a device which includes a rotor for first scoring a vegetable and then cutting off the scored portion to form dice.

Another object of the invention is the provision in a vegetable dicer of a scorer which is rotated and at the same time reciprocated to produce a substantially straight score in the vegetable.

A further object of the invention is the provision in a vegetable dicer of a rotor carrying a plurality of groups of scoring knives, the scoring knives in one group being disposed angularly with respect to the axis of the cylinder, and the scoring knives in the other group being disposed at a different angle with respect to the axis of the cylinder. The scoring knives in the first group are adapted to produce a plurality of substantially parallel scores in a vegetable when such cylinder is rotated and is moving axially at the same time; and said second group of knives being adapted to score the vegetable along a plurality of lines angularly with respect to the first-mentioned scoring while said cylinder is rotated and moving axially in the opposite direction.

Still another object of the invention is the provision in a vegetable dicer of a cylinder carrying a first scoring means adapted to score the vegetable when the cylinder is being rotated and is moving axially in one direction, the provision of a second group of scoring knives adapted to score the vegetable angularly with respect to the first scoring when said cylinder is being rotated and moved axially toward its initial axial position, and the provision of a cutter for cutting off the scored portion of said vegetable after said cylinder has returned to its initial axial position.

A further object of the invention is the provision in a vegetable dicer of a removable cylinder carrying scoring knives and a cutter.

A further object of the invention is the provision in a vegetable dicer of the character described in which means is provided for causing the cylinder to rotate without axial movements.

Other objects of the invention will be apparent to those skilled in the art.

Referring to the drawings—

Figure 1 is a cross sectional elevation of one embodiment of the new and improved vegetable dicer, showing the cylinder after the same has moved longitudinally to its outermost position;

Figure 2 is an end elevation of the device shown in Figure 1;

Figure 3 is a cross sectional elevation similar to Figure 1 with the exception that the device is set to prevent axial movement of the cylinder;

Figure 4 is a sectional elevation of the device shown in Figure 3, taken along the line 4—4;

Figure 8 is a fragmentary view in section showing a ball engaging the groove for causing the cylinder to reciprocate axially in accordance with the form of the groove;

Figure 9 is a view similar to Figure 8, showing the ball released from the groove;

Figure 10 is a fragmentary plan view as seen along the line 10—10 of Figure 9;

Figure 12 is an end view of the modification shown in Figure 11;

Figure 13 is an elevation of several of the scoring blades 67 as shown along the line 13—13 in Figure 6;

Figure 14 is a view of several of the scoring blades 71 as viewed along the line 14—14 of Figure 7;

Figure 15 is a development of the surface of the cylinder assembly 60; and

Figure 16 is a fragmentary view showing the tool cylinder 60$^a$ slotted and carrying a modified form of scoring blade assembly.

Figure 5:
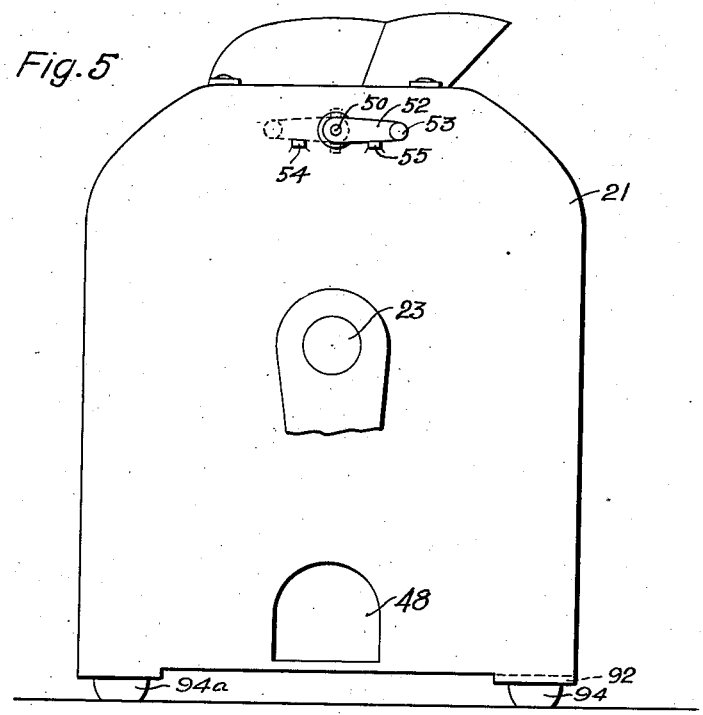
Figure 5 is a main view of the device shown in Figure 1, as viewed from the drive end.

Referring to Figure 1, the device is contained within a casing generally indicated by the numeral 20. The end wall 21 of the casing carries a bearing 22, in which the shaft 23 is journaled. The shaft 23 has a shoulder portion 24 which bears against the bearing 22. A cylindrical member 25 is secured to the end wall 21 and a web 26 formed therein carries a bushing bearing 27 which supports the shaft 23 at a point spaced apart from the bearing 22. The stationary cylinder 25 has a continuous groove 28 formed therein. This groove may be of any desired shape and is provided for causing longitudinal or axial movement of the cutter cylinder, for the purpose of scoring vegetables, as will presently be described.

A follower cylindrical member 29 has a cylindrical portion 30, the interior of which may form a working fit with the exterior surface of the stationary cylinder 25. A radial flange 31 may be formed integral with the cylinder 30 at one end thereof. At the other end, the cylinder 30 is provided with a closure wall 32 having a boss 33 formed integral therewith and projecting outwardly from the cylinder 30. An extension 33ª of the boss 33 projects inwardly from the wall 32. The boss 33 and its extension 33ª are bored out to form a bore 34 which forms a working fit on the shaft 23. The bore 34 terminates at an end wall 35 of the boss 33 so that no oil or other lubricant can come in contact with any of the vegetables being cut.

A longitudinal groove 36 is formed in the shaft 23, and this groove is engaged by a ball 37 which forms in effect a key. An extension boss 38 formed integral with the boss 33 and the wall 32, has a radial hole 39 which is threaded to accommodate a set screw 40. By means of the set screw 40, the ball 37 may be retained in working engagement with the groove 36.

The cylinder 30, within an area adjacent the flange 31, is provided with a boss 41. This boss (referring to Figures 8, 9 and 10 which show enlarged sections) is provided with a radial hole 42 in which a ball 43 may freely move. A slot formed in the boss 41 adjacent to its junction with the cylinder 30 has pivotally mounted therein a plate 44. The plate 44 has a tab 45 formed integral therewith and is pivoted on a screw 46. The screw 46 also serves to retain a plate 47 on said boss to form a closure for the hole 42.

By means of the tab 45, the plate may be rotated on its pivot to the position shown in Figures 1 and 8 to maintain the ball 43 in engagement with the groove 28, and when the ball is so maintained, the cylinder 30 oscillates longitudinally as it is rotated. When it is desired to disengage the ball 43 from the groove 28, by means of the tab 45 the plate 44 may be swung to the position shown in Figure 9, thereby freeing the ball from the groove 28 and allowing it to loosely move in the hole 42 as the cylinder 30 is rotated. When the cylinder is rotated at a high speed, the ball 43 will remain in contact with the plate 47. When the cylinder 30 is in the position shown in Figure 3, the tab 45 may be reached through an opening 48 formed in the end wall 21. It will be noted that when the cylinder 30 is in the position shown in Figure 3, the flange 31 is adjacent to the wall 21.

The bushing 49, mounted in the wall 21, has pivotally mounted therein a shaft 50 having an angular extension 51. Positioned outside of the wall 21, and secured to the shaft 50, is a lever 52 carrying at its outer end a boss 53 which serves as a handle. Positioned on the wall 21 (Figure 5) is a stop 54 which limits the movement of the lever in a counterclockwise direction, and a stop 55 which limits the movement of the lever in a clockwise direction.

When the cylinder 30 is in the position shown in Figure 3, which is its normal position, the lever 52 may be rotated in a counter-clockwise direction to the position shown in dotted lines. This causes the shaft 50 to rotate 180° degrees and position the extension 51 in front of the flange 31 to retain the cylinder 30 in its normal position, as shown in Figure 3. When this is done, the ball 43 is released by swinging the tab 45 (by reaching through the hole 48 with one's finger) to swing the plate 44 out of engagement with the ball 43, thereby leaving the ball free.

The shaft 23 has secured thereto a crank 56 carrying a handle 57 by means of which the shaft may be rotated. The handle 57 is secured to the shaft by any suitable means, for example by means of a set screw 58.

The wall 32 of the cylinder 30 carries a plurality of headed studs 59, by means of which attachments may be secured thereto.

By way of example, a dicer cylinder 60 is shown mounted on the wall or head 32. This cutter cylinder consists of a cylinder proper 61 with an inwardly extending annular web 62. The web 62 is provided with a plurality of holes 63 of a suitable diameter to clear the heads of the studs 59. Each hole 63 has extending therefrom a slot 64, of a width fitting the diameter of the shank portion of the headed studs 59 so that when the cylinder assembly 61 is applied to the wall or head 32, the studs 59 may pass through the holes 63, after which the cylinder may be angularly displaced to bring the heads of the studs 59 over the slots 64 and thereby the cylinder assembly is retained in position on the wall or head 32.

Any number of the headed studs may be employed; however, I prefer to use three of these heads, spaced 120° apart, and have found that they serve admirably for locating the cylinder assembly 60 in substantially concentric relation with the boss 33 and the shaft 23.

The cylinder assembly 60 carries (Figure 2) a scoring knife assembly 65. This assembly is shown in detail in Figures 6 and 13, and consists of a plate 66 having a plurality of scoring blades 67 angular with respect to the axis of said plate and in parallel relation to each other, so that as the assembly 60 is rotated in a clockwise direction (in a counter-clockwise direction as seen in Figure 2), a vegetable positioned in the holder 68 will first be encountered by the scoring blades 67.

The groove 28 in the stationary cylinder 25 is so formed that at the time the blades 67 encounter the vegetable, the cylinder 30 and the cylinder assembly 60 carried thereby are, in addition to being rotated, moved longitudinally, with the result that the scoring blades 67 produce in the vegetable a plurality of substantially parallel scores which are angular with respect to the axis of the shaft 23. By the time this has occurred, the cylinder 30 and the assembly carried thereby has moved to its extreme outward position. This is the position shown in Figure 1. As the operator continues to rotate the cylinder 30 and the assembly carried thereby, the cylinder and the assembly are moved from the extreme outward position, such as that shown in Figure 1, toward the extreme inner or normal position.

Figure 7:
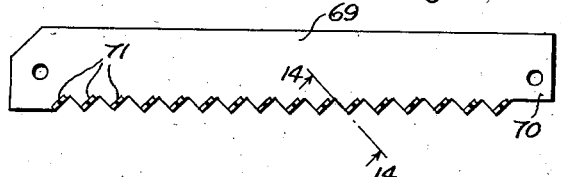
Figure 7 is a plan view of the other group of scoring knives.

A scoring knife assembly 69, Figures 7 and 14, which consists of a plate 70, carrying a plurality of scoring blades 71 angular with respect to the axis of the plate 70 and in parallel spaced relation to each other, is carried on the assembly 60, as shown in Figure 2.

During the return of the cylinder 30 and the assembly to its extreme near or normal position, the scoring blades 71 produce in the vegetable a plurality of substantially parallel scores which are angular with respect to those previously produced by the scoring blades 67, thus in less than one-half revolution of the shaft 23 the vegetable has been scored with a plurality of scores in each of two directions which are practically at right angles to each other, so that to produce dice it is only necessary to cut off the portion of the vegetable which has been scored.

A curved cutting knife 72 is mounted over an opening 73 formed in the cylinder 61. The back edge of the knife 72 is secured to the cylinder 61 along the boundary 73ª of the opening 73. The other end of the knife 72 (the cutting end) is secured to a Z-shaped bracket 74 by means of rivets one of which is shown at 75.

The bracket 74 is secured to the boundary 73b of the opening 73. A curved member 76 is mounted within the cylinder 61 also spanning the opening 73 and serves to facilitate the discharge of the diced vegetables from the machine.

The member 76 may be secured to the boundary 73a of the opening by means of rivets, one of which is shown at 77. Likewise, the end of the member 76, paralleling the boundary 73b and the Z-shaped brackets, may be secured to the boundary 73b by means of rivets one of which is shown at 78.

It will be noted that the thickness of the wall of the cylinder 61 begins to thicken at the point 79, and is increasingly thicker up to the boundary 73b. The increase in thickness is on the outside of the cylinder, therefore, this increasingly thickened portion acts as a cam to slightly raise the vegetable just prior to the time the knife 72 cuts off the then already scored vegetable.

After the scoring blades 71 have scored the vegetable while the assembly was rotated and at the same time moved back to its normal position as described above, further rotation causes the vegetable to cam up and the cutting knife 72 engages the scored vegetable and cuts off the scorings which form dice. These dice pass out endwise from the space between the member 76 and the knife 72. This camming up action makes sure that the vegetable is raised high enough for the knife 72 to encounter only scored portions of the vegetable.

The development of the surface of the cylinder assembly 60 is shown in Figure 15 and gives a good idea of the relative positions and space relations of the scoring knife assemblies 66, 70 and the cutting knife 72. The cylinder surface moves relative to the vegetable in the circumferential direction indicated by the solid arrow and moves axially in the directions indicated by the dotted arrows.

The vegetable holder 68 has a flat surface 80 and a second flat surface 81 angular with respect thereto, one of which serves as a backing for the vegetable when the cylinder is scoring the vegetable in one direction, and the surface 81 serving as a backing for the vegetable when the scoring is being effected in the opposite direction.

When the cutting-off operation is effected, the vegetable is backed by both the surface 80 and the surface 81 which form a V with each other. The holder 68 extends through an opening formed in the top wall 82 and may be secured thereto by rivets 83.

The side walls 84, 85, recede toward the bottom endwise so that a shallow vessel may be placed to receive the diced vegetables discharged. A bottom plate 86 bridges ears 87, 88, formed integral with the side walls 84, 85, respectively, and securing members 89 serve to secure the plate 86 to the ear 87 and also to secure a rubber foot 90 thereto. Likewise, a securing member 91 secures the plate 86, ear 88, and the rubber foot 90 together. The wall 21 is also provided with inwardly extending ears, one of which is shown at 92, which are secured to plate 86 and to the rubber foot 90 by a fastening member 93.

When the cylinder 30 and the assembly carried thereby is in the position shown in Figure 3, the ball 43 being released, as shown, and the flange 31 being engaged by the extension 51 of the shaft 50, the cylinder 30 and the assembly carried thereby can only be rotated and has no longitudinal motion due to the fact that the flange 31 is engaged by the extension 51, and also due to the fact that the ball 43 is disengaged from the groove 28. The assembly 61 may be removed and other attachments may be secured in operative position on the wall or head 32 of the cylinder 30 for other operations, some of which attachments may be adapted for slicing operations only.

Figure 11:
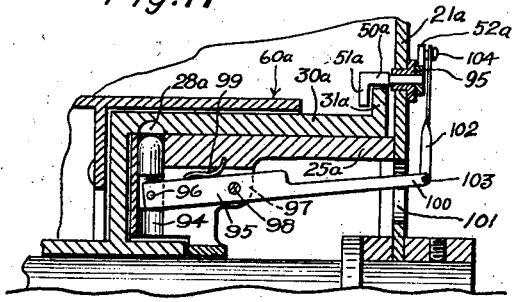
Figure 11 is a sectional view of a modification of the device depicting an alternative arrangement for disabling the oscillating mechanism.

In the modification shown in Figure 11, the stationary cylinder 25a is not grooved, as was the case with the cylinder 25. The cylinder 30a has a groove 28a formed internally, and a plunger 94 has a round nose adapted to fit the groove 28a and is reciprocable in a radial hole formed in the stationary cylinder 25a. This plunger may be slotted at its midpoint and a lever 95 is pivotally connected thereto by means of a pivot pin 96.

The lever 95 is pivotally mounted on a boss 97 by means of a pivot screw 98. A spring 99, secured to the inner wall of the stationary cylinder 25a, bears against the lever 95 and urges the plunger 94 out of engagement with the groove 28a. The lever 95 has one end 100 extending through a hole 101 formed in the wall 21a, and is pivotally connected to a link 102 by means of a pivot pin 103.

The upper end of the link 102 is pivotally connected to the lever 52a by means of a shouldered screw 104, said screw being displaced from the center of the shaft 50a a distance equal to one-half of the swing of the end 100 of the lever 95, so that when the lever 52a is swung from one extreme position to the other, the plunger 94, if disengaged from the groove 28a, will engage the same, or vice versa. It is obvious that when the lever 52 is rotated in this manner to bring the plunger 94 into or out of engagement with the groove 28a the shaft extension 51a will free the flange 31a when the plunger engages the groove, and will engage the flange 31a when the plunger is released from the groove.

In Figure 12 the position of the lever 52a shown in dotted lines is the position in which the round end or nose of the plunger 94 is disengaged from the groove 28a.

When the lever 52a is in this position it will also be noted that the shaft extension 51a overhangs the flange 31a to prevent the cylinder 30a from moving axially on the stationary cylinder 25a.

When the lever 52a is moved 180° counterclockwise to the position shown in dotted lines in Figure 12 the shouldered screw 104, which is the joint between the link 102 and the lever, is also moved 180° and arrives at a position in which it is below the shaft 50a and the link 102, which is pivotally connected to the end 100 of the lever 95, is moved downwardly. This causes the plunger 94 to move upwardly, as viewed in Figure 11, and its round nose to engage the groove 28a.

The movement of the lever 52a from its solid position to its position shown in dotted lines (180°) causes the shaft extension 51a to also move 180° and point upwardly as shown in Figure 11. This leaves the cylinder 30a free to move longitudinally in accordance with the configuration of the groove 28a.

In the modification shown in Figure 16, the tool cylinder designated by the numeral 60a, is provided with slots one of which is shown and designated by the numeral 110. The scoring blades 111 are carried on a base 112 which may be preferably die cast. The base 112 fits the slot 110 and may be secured therein in any suitable manner—for example, by means of screws one of which is shown at 113.

Figure 6:
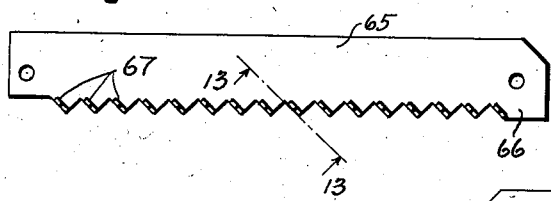
Figure 6 is a plan view of one group of scoring knives.

The blades 111 are set in or molded in to the base 112 at the proper angles to effect the scoring of the vegetable during the longitudinal (and rotary) shifts of the cylinder—for example, the scoring blade assembly, carrying blades to take the place of the scoring blades 67, are angularly disposed relative to the axis of the base 112 in the same relation as the scoring blades 67 are to the axis of the assembly shown in Figure 6 and the scoring blade assemblies carrying scoring blades to take the place of the blades 71, are angularly disposed to the base 112 as the blades 71 are to the axis of the base 70, shown in Figure 7. This construction enables either scoring blade assembly to be easily removed and replaced in case they become damaged.

Although a simple embodiment of the invention is herein shown and described by way of example, it is obvious that many changes may be made in the device shown to produce primarily the effect of parallel scorings by combined rotary and axial movement without departing from the spirit of the invention as set forth in the annexed claims.

What is claimed is:

1. In a vegetable cutter, a frame having a base and a portion substantially overhanging said base, the end of the overhanging portion being open, a cylinder rotatably carried in said frame, means for reciprocating said cylinder axially as it rotates, a station having a V-shaped portion for holding a vegetable, a group of parallel scoring blades carried by said cylinder for producing scores in said vegetable when said cylinder is moved axially in one direction as it rotates, said vegetable being backed up by one leg of said V, a second group of parallel scoring blades carried by said cylinder for producing other scores angular with respect to said first scores as said cylinder is moved axially in the opposite direction as it rotates, said vegetable being backed up by the other leg of said V, means also carried by said cylinder for cutting off the scored portion of said vegetable and thereby forming dice, and means carried in said cylinder for causing said dice to fall beyond the extremity of said frame.

2. In a vegetable cutter, a frame, a shaft, bearings in said frame for supporting said shaft, a station on said frame for locating a vegetable, a first cylinder rotatably carried in said frame on said shaft and overhanging said bearings, means for rotating said cylinder, means for cyclically moving said cylinder axially as it rotates, a second or tool cylinder detachably mounted on said first cylinder in overhanging relation, a group of parallel scoring blades carried by said second cylinder for producing scores in said vegetable when said cylinders are moved axially in one direction as they rotate, a second group of parallel scoring blades carried by said second cylinder for producing other scores angular with respect to said first scores as said cylinders are moved axially in an opposite direction as they rotate, means carried by said second cylinder for cutting off the scored portion of said vegetable, and means carried by said second cylinder for causing the cut-off portions of the vegetable to fall clear of said frame.

3. In a vegetable cutter, a frame, a station on said frame for locating a vegetable, a propellable cylinder rotatably carried in said frame, means for rotating said cylinder, means for cyclically moving said cylinder axially during its rotation, a tool cylinder detachably secured to said first-mentioned cylinder, a group of parallel scoring blades carried by said tool cylinder for producing scores in said vegetable during one cycle of axial motion as said cylinder rotates, a second group of parallel scoring blades carried by said tool cylinder spaced apart circumferentially from said first group for producing other scores in said vegetable angular with respect to said first scores during a second cycle of axial motion as said cylinder rotates, a cutting-off knife carried by said cylinder and spaced apart circumferentially from said groups of scoring blades for cutting off the scored portion of said vegetable, and means carried in said tool cylinder for causing the cut-off vegetables to discharge therefrom beyond the discharge end of said frame.

4. The invention according to claim 3 in which said station for holding a vegetable is located on said frame in a zone traversed by both said groups of scoring blades and said knife and has a V-shaped portion against which the vegetable rests when being scored and cut, whereby during one cycle of said axial motion the vegetable is backed up by one leg of the V, during the other cycle of said axial motion the vegetable is backed up by the other leg of the V, and during the time said knife is cutting off the scored portion of the vegetable said vegetable is backed up by both legs of the V.

5. The invention according to claim 3 in which said station for holding a vegetable is located on said frame in a zone traversed by both said groups of scoring blades and said knife and has a V-shaped portion against which the vegetable rests when being scored and cut, the inclination of said station being such that its angular relation to the tangential plane of the uppermost surface of the tool surface is greater than 90°.

6. In a vegetable cutter, in combination, a frame, a station on said frame including a V-shaped portion for locating a vegetable to be cut, a shaft supported in bearings in said frame, a rotor mounted on said shaft and having a tubular extension projecting from one end thereof enclosing one end of said shaft, the terminus of said extension being closed, a key in said shaft engaging the interior of said rotor, whereby the latter may be moved endwise on said shaft, means secured to the other end of said shaft for rotating the same, means partly on said rotor and partly in fixed relation to said frame for causing said rotor as it rotates to move axially from its normal position during one portion of a revolution, to move axially in an opposite direction to return to its normal position during another portion of said revolution, and to remain in its normal position during the remainder of said revolution, and tools carried on said rotor in spaced relation to each other for successively performing operations on said vegetable during the aforementioned portions of each revolution of said rotor, said V-shaped portion of said station positively backing up said vegetable during each of said operations and said tubular extension of said rotor serving to prevent cut vegetables from coming in contact with said first end of said shaft.

7. A vegetable cutter according to claim 6 in which the rotor is comprised of a first member associated with said shaft, and a second member detachably mounted on the first member and readily removable for cleaning purposes, and in which said first member carries the part of said means partly on said rotor.

8. The combination according to claim 6 in which the means partly in fixed relation to said frame is comprised of a stationary cylindrical member carrying said bearings for the shaft and having a follow cam groove formed therein, and in which said means partly on said rotor is comprised of an engaging member engaging and following said follow cam groove.

9. The combination according to claim 6 in which said means partly on said rotor comprises a follow cam groove formed internally in a cylindrical portion of said rotor, and in which said means partly in fixed relation to said frame comprises an engaging member positionable in a fixed cylindrical member on said frame carrying said bearings for said shaft and adapted to be placed in engagement with said internal groove.

10. A vegetable cutter according to claim 6 in which the rotor is comprised of a member associated with said shaft and a second member detachably mounted on the first member, and in which the said means partly on said rotor and partly in fixed relation to said frame may be disabled for cutting operations in which it is unnecessary for said rotor to move axially as it rotates.

11. A vegetable cutter according to claim 6 in which the end of said rotor opposite said tubular extension has a radial flange formed thereon, in which a member is provided on said frame for engaging said flange and holding said rotor against axial movement, and in which means is associated with said member on said frame for disabling said means partly on said rotor and partly in fixed relation to said frame to cause said rotor to remain in its normal position in said frame during each complete revolution of said rotor.

12. In a vegetable cutter in combination, a frame, a station on said frame for locating a vegetable to be cut, a shaft, a rotor, said rotor being comprised of a member associated with said shaft, and a second member detachably mounted on said first member, a cylindrical member fixedly mounted on said frame in concentric relation with said shaft, a continuous groove formed in the outer surface of said cylinder and comprising a follow cam, means on said first-mentioned member for engaging said groove and causing said rotor to move axially during certain portions of each revolution thereof, and tools carried on said second member for performing operations on said vegetable.

13. A vegetable cutter according to claim 12 in which said frame includes a flat top having an opening formed therein, and in which said station on said frame for locating a vegetable to be cut is secured to said flat top spanning said opening, said opening being positioned in a zone traversed by said tools, said station having a V-shaped portion against which the vegetable rests when being operated upon, said V-shaped portion having flat sides which are inclined to each other at an angle of less than 90°, said V-shaped portion also being inclined to the flat top of said frame at an angle greater than 90°, whereby the tendency of the vegetable to move when engaged by said tools is minimized.

14. In a vegetable cutter in combination, a frame, a station on said frame for locating the vegetable to be cut, a shaft, a stationary cylinder secured to said frame in concentric relation with said shaft and including an outboard bearing for said shaft, a follow groove formed in said cylinder, a second cylinder adapted to nest on to said first cylinder, said second cylinder being slidably keyed to said shaft and having a radial flange at one end thereof and having an enclosed tubular portion at the other end thereof fitting over said shaft for preventing oil or other lubricants from contaminating the vegetables after they have been cut, means on said second cylinder adjacent to said flange adapted to be placed in cooperative relation with said groove for causing said second cylinder to move longitudinally on said shaft when the latter is rotated, a third cylinder detachably mounted on said second cylinder and carrying a pair of groups of scoring blades in spaced relation with each other, and a cutting off knife spaced apart from said groups, said scoring blades being adapted to score said vegetable, and said cutting off knife being adapted to cut off the scored portions of said vegetable, means for disassociating said means on said second cylinder from said groove in said first cylinder, and means carried on said frame for engaging said flange to prevent axial movement of said second cylinder.

15. A vegetable cutter according to claim 14 in which said station for locating a vegetable to be cut includes a V-shaped portion, whereby when one of said groups of scoring blades is traversing said vegetable the latter is backed up by one leg of the V, when said second group of scoring blades is traversing the vegetable the latter is backed up by the other leg of said V, and when said cutting off knife is traversing the vegetable the latter is backed up by both legs of the V.

KUNO W. MESTERTON.